US010435072B2

(12) United States Patent
Walsh et al.

(10) Patent No.: US 10,435,072 B2
(45) Date of Patent: Oct. 8, 2019

(54) ROAD CAMBER COMPENSATION

(71) Applicant: Ford Global Technologies, LLC, Dearborn, MI (US)

(72) Inventors: John Walsh, Commerce Township, MI (US); Timothy Panagis, Ypsilanti, MI (US); Daniel Slavin, Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 165 days.

(21) Appl. No.: 15/461,631

(22) Filed: Mar. 17, 2017

(65) Prior Publication Data

US 2018/0265127 A1 Sep. 20, 2018

(51) Int. Cl.
*B62D 15/02* (2006.01)
*B62D 5/04* (2006.01)
*B62D 6/00* (2006.01)

(52) U.S. Cl.
CPC ......... *B62D 15/025* (2013.01); *B62D 5/0421* (2013.01); *B62D 5/0463* (2013.01); *B62D 6/00* (2013.01); *B62D 15/021* (2013.01)

(58) Field of Classification Search
None
See application file for complete search history.

(56) References Cited

U.S. PATENT DOCUMENTS

| 8,798,865 | B1 | 8/2014 | Raad et al. |
| 8,874,322 | B2 | 10/2014 | Mori et al. |
| 2005/0216165 | A1* | 9/2005 | Ito ............... F02D 41/083 701/84 |
| 2015/0025743 | A1* | 1/2015 | Tamura ............ B62D 5/046 701/41 |
| 2015/0025748 | A1* | 1/2015 | Hagnander ......... B60W 50/02 701/45 |
| 2015/0088380 | A1* | 3/2015 | Gabor ............... B60L 7/10 701/41 |
| 2017/0015351 | A1* | 1/2017 | Endo .............. B62D 6/00 |
| 2017/0137023 | A1* | 5/2017 | Anderson ......... B60G 17/0195 |
| 2017/0182859 | A1* | 6/2017 | Anderson ......... B60G 17/019 |

FOREIGN PATENT DOCUMENTS

| JP | 5315769 | 7/2013 |
| JP | 2016029559 | 3/2016 |
| KR | 20140047435 | 4/2014 |
| WO | 2016117806 | 7/2016 |

OTHER PUBLICATIONS

Lincoln, "Lincoln Drive Control: Continously Controlled Damping," 13 pages.

* cited by examiner

*Primary Examiner* — Thomas G Black
*Assistant Examiner* — Demetra R Smith-Stewart
(74) *Attorney, Agent, or Firm* — Ray Coppiellie, Esq.; Hanley, Flight & Zimmerman, LLC

(57) ABSTRACT

A steering compensation apparatus includes a road camber determiner to determine a first road camber at a road position in front of a vehicle using wheel trajectory data and height data of the road position, a road camber logic circuit to select, via a torque mapper mapping a plurality of road cambers to a plurality of first compensating torques, a first compensating torque corresponding to the first road camber and a steering controller to drive a motor to deliver the selected first compensating torque to a steering rack at the road position responsive to the first road camber.

20 Claims, 10 Drawing Sheets

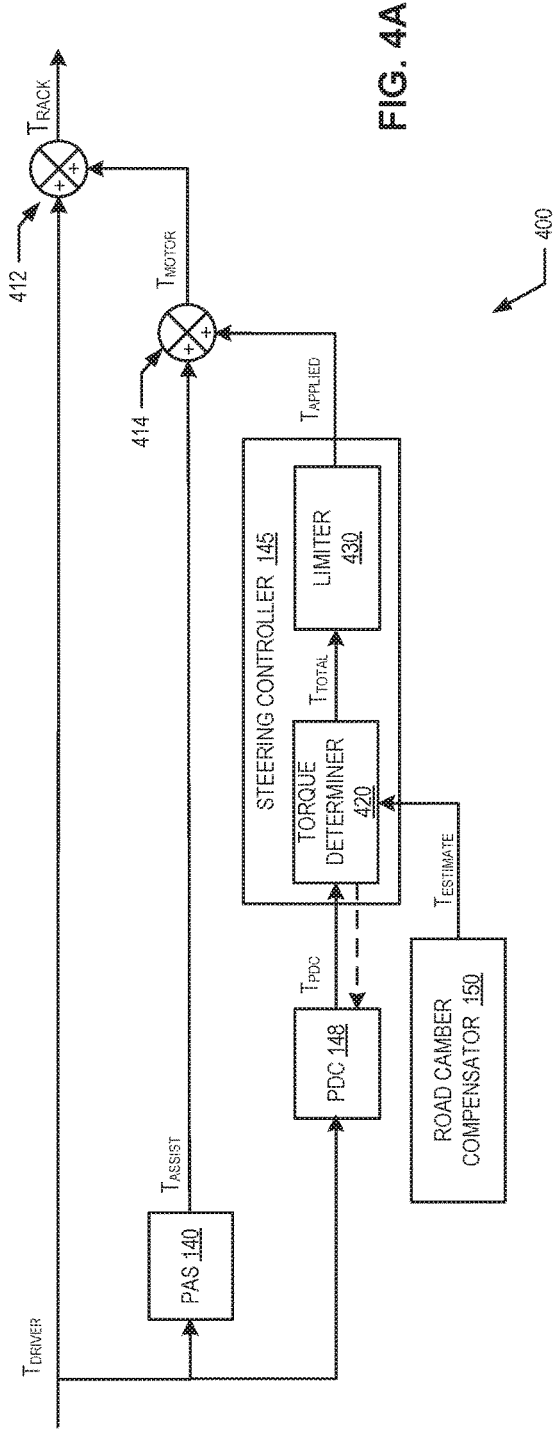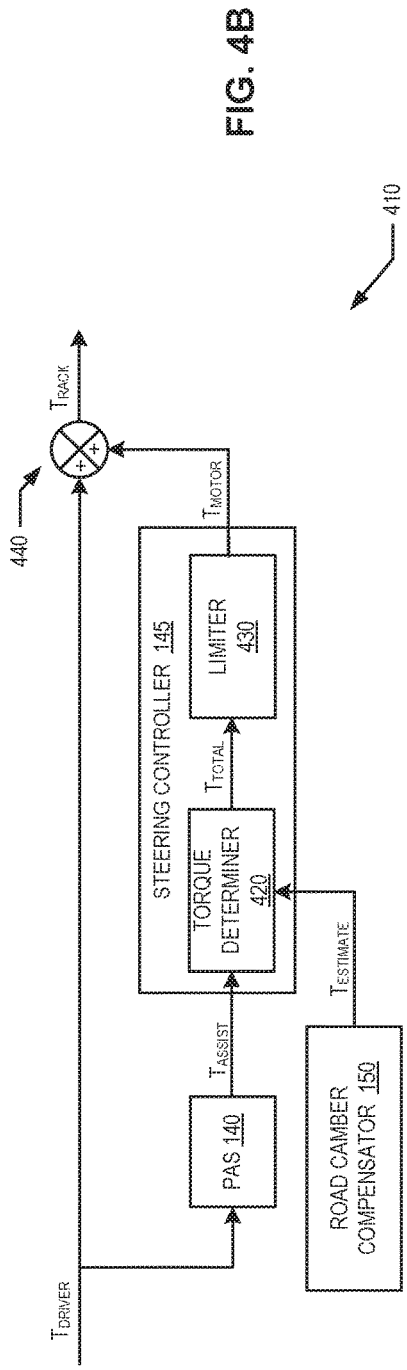
FIG. 4A
FIG. 4B

ROAD CAMBER COMPENSATION

FIELD OF THE DISCLOSURE

This disclosure relates generally to vehicle steering systems and, more particularly, to road camber compensation.

BACKGROUND

Road camber, or cross slope, is a slope of a road perpendicular to the road centerline. The road camber is commonly 1-2%, with the road surface angling slightly downwardly from the crown, or high point, at the centerline of the road to a low point at the edges of the road (e.g., curb, shoulder/median, etc.). Road camber is provided, in part, to facilitate drainage of rainwater, to enhance contact between vehicle wheels and the road and to maintain the strength and durability of the surface concrete and sub-grade soil, which can be harmed by water infiltration.

In some examples, the road camber may be parabolic, straight line, or a combination of straight line and parabolic. The road camber is generally between about 1-3% for straight segments of roadway, but increases to higher values (e.g., 5-10%) for curves (e.g., about 10% for sharp, superelevated curves to account for centrifugal forces acting on the vehicle relative to the radius of the curve and intended speed limited for vehicles traversing the curve).

Despite the benefits of road camber, the road camber adversely impacts steering and biases steering away from the center of the road. To maintain forward movement of the vehicle in a straight line, the driver is often required to apply a slight torque to the steering wheel to compensate for the tendency of the vehicle to pull in the direction of a low point at an edge of the road.

Driver compensation for road camber may vary in perceptivity and degree based on factors including, but not limited to, degree of road camber, vehicle type, vehicle loading, wheel type, wheel condition, vehicle camber, suspension alignment, and weather (e.g., crosswinds, etc.). In general, tracking of the vehicle off center due to road camber is undesirable and sometimes tiring to the driver, who must consistently input torque to the steering wheel ensure forward movement of the vehicle in a straight line.

SUMMARY

In one example, a steering compensation apparatus includes a road camber determiner to determine a first road camber at a road position in front of a vehicle using wheel trajectory data and height data of the road position, a road camber logic circuit to select, via a torque mapper mapping a plurality of road cambers to a plurality of first compensating torques, a first compensating torque corresponding to the first road camber and a steering controller to drive a motor to deliver the selected first compensating torque to a steering rack at the road position responsive to the first road camber.

In another example, a steering compensation method includes determining, via a road camber compensator, a road camber at a road position in front of a vehicle using wheel trajectory data and height data of the road position, determining, from the road camber, a first compensating torque to apply to a steering rack and applying the first compensating torque to the steering rack at the road position.

In yet another example, a tangible machine readable storage medium comprising instructions that, when executed, cause a processor to at least determine a road camber at a road position in front of a vehicle using wheel trajectory data and height data of the road position, determine a first compensating torque to apply to a steering rack, via a vehicle power steering assist system and apply the first compensating torque to the steering rack at the road position.

BRIEF DESCRIPTION OF THE DRAWINGS

FIGS. 4A-4B are block diagrams of a first example steering compensator and a second example steering compensator in accordance with the teachings of this disclosure.

Figure 1:
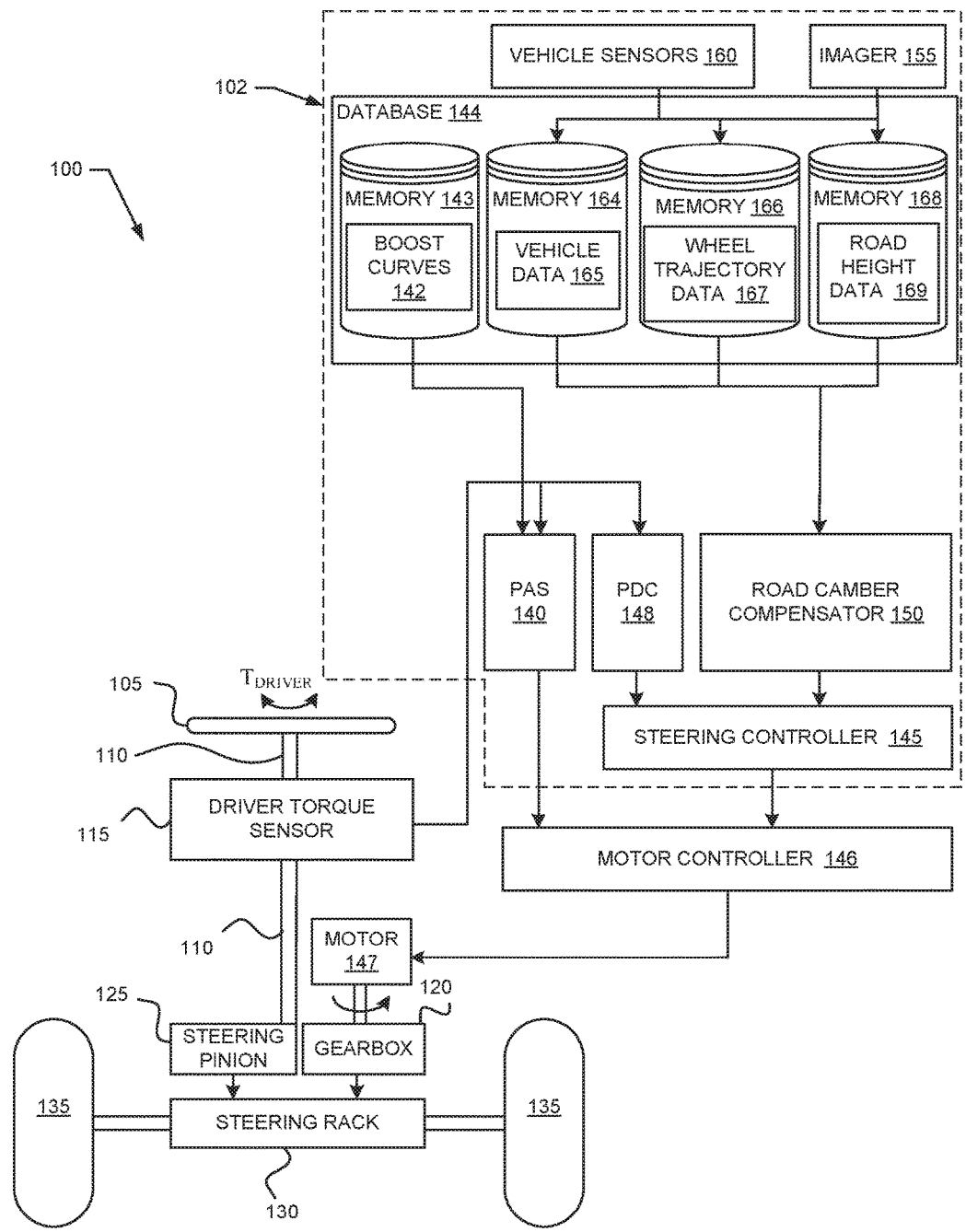
FIG. 1 is a block diagram of an example steering system and an example steering compensator in accordance with the teachings of this disclosure.

The figures are not to scale. While the present disclosure is susceptible to various modifications and alternative forms, specific examples are shown and described herein. It should be understood, that the present disclosure is not limited to the particular forms and examples disclosed and instead covers all modifications, equivalents, embodiments, and alternatives falling within the spirit and scope of the present disclosure.

DETAILED DESCRIPTION

Disclosed herein are example steering compensation devices and systems and methods for correcting for road camber via such example steering compensation devices.

When a vehicle is headed in a straight-ahead direction, a driver may be required to apply a small compensating torque to the steering wheel and maintain the vehicle steering wheel in a slightly off-centered position to prevent the vehicle from deviating from the straight-ahead heading responsive to road camber. Pull-drift compensation systems have been developed to track the assistive torque applied by the driver to the power steering assist system and to phase in a corresponding compensating torque, over a period of time, to reduce and/or eliminate a need for the driver to maintain the assistive torque. Once the pull-drift compensation system learns an appropriate amount of compensating torque to apply, the pull-drift compensation system may continue to automatically apply this compensating torque using the power steering assist to relieve the driver from the burden of continuing to apply the assistive torque to maintain the straight-ahead heading.

The pull-drift compensation responds to the assistive torque applied by the driver to the power steering assist system. Thus, the pull-drift compensation logic adapts slowly to changes in road camber. A vehicle lane change to a different portion of a road with an opposite road camber or a different road camber will cause the pull-drift compensation torque output by the pull-drift compensation logic to be initially opposed to the driver's torque input for the different portion of the road. The pull-drift compensation logic eventually adapts to the changing compensating torque applied by the driver as the driver seeks to maintain the straight-ahead heading on the different portion of the road having the different road camber. However, the pull-drift compensation system may take between about 15-30 seconds to adapt to the changing driver assistive torques and, during that time, the pull-drift compensation system disadvantageously works in opposition to the driver for a portion of that adjustment time until it can adjust to the new road camber and apply a correct torque offset corresponding to the new road camber.

The example steering compensator described herein, and more particularly the example road camber compensator described herein, provide a variety of strategies to measure road camber and to apply a compensating torque responsive to the measured road camber faster and more accurately than is currently possible using pull-drift compensation techniques, which require significant time to correct in response to transient changes and driver inputs. In some examples, the example road camber compensator uses an imaging device to image the road surface in front of the vehicle and estimates trajectories of the wheels on the upcoming road surface to determine a localized road camber estimated to apply individually to each wheel. Thus, in some examples, the example road camber compensator predicts a torque that will be required to compensate for a road camber at points in front of the moving vehicle and apply a corresponding compensating torque for that road camber when the wheels of the vehicle are at those points. Accordingly, the example road camber compensator provides for a markedly faster torque correction that is permitted by existing pull-drift compensation systems. In some examples, the example road camber compensator also uses vehicle sensors to obtain vehicle data indicative of changes to a state of the vehicle. This data is used by the example road camber compensator to estimate dynamic forces on the vehicle (e.g., vehicle vertical forces arising from longitudinal acceleration, weight transfer, etc.) and applied as a feed-forward torque to the example steering compensator to better adapt the steering compensation to the vehicle dynamics.

FIG. 1 is a block diagram of an example steering system 100 and an example steering compensator 102 in accordance with the teachings of this disclosure. The example steering system 100 includes an example steering wheel 105 designed to receive a driver torque input ($T_{DRIVER}$), denoted by an arrow, and to transmit the driver torque to an example steering shaft 110 connected to the steering wheel 105. The example steering shaft 110 is operatively coupled to an example driver torque sensor 115 and an example steering pinion 125. The example steering pinion 125 operatively engages a steering rack 130 coupled, at each end, to a wheel 135 of the vehicle. In some examples, a gearbox 120 is operatively associated with the example steering shaft 110 or example steering pinion 125. In other examples, the gearbox 120 is operatively associated directly with the steering rack. Rotation of the example steering wheel 105 transmits the driver torque input $T_{DRIVER}$ via the example steering shaft 110 to cause rotation of the example steering pinion 125, which in turn causes a translation of the example steering rack 130, thereby causing the wheels 135 to rotate about a substantially vertically oriented axis to change a direction of movement of the vehicle.

The example steering compensator 102 includes an example power-assist steering (PAS) 140. The PAS 140 receives, as an input, the driver input torque $T_{DRIVER}$ to the steering wheel 105 output from the example driver torque sensor 115. The PAS 140 uses the driver input torque $T_{DRIVER}$ to look up an assistive torque, using vehicle-specific boost curves 142 stored in an example memory 143 of an example database 144, to amplify the driver input torque $T_{DRIVER}$. In some examples, the PAS 140 is a hydraulic system (HPAS), an electro-hydraulic system (EH-PAS), or an electro-mechanical system (EPAS). The PAS 140 outputs to the example motor controller 146 a required motor 147 output corresponding to the assistive torque 142 specified by the boost curve value relating to the driver input torque $T_{DRIVER}$. The example motor controller 146 controls an output of an example motor 147 configured to apply a torque, via example gearbox 120, to the example steering pinion 125. The example steering pinion 125 engages teeth of an example steering rack 130 such that rotation of the steering pinion 125 causes a corresponding translation of the steering rack 130 and a corresponding rotational movement of example wheels 135 about a vertical axis to effect steering movement. The assistive torque provided to the example steering rack 130 from the PAS 140 reduces the driver input torque $T_{DRIVER}$ required to effect a change in steering and improves steering comfort and responsiveness.

The example steering compensator 102 also includes an example pull-drift compensator (PDC) 148. The PDC 148 receives, as an input, the driver input torque $T_{DRIVER}$ to the example steering wheel 105. As noted above, the pull-drift compensation reduces a constant pull on the example steering wheel 105 during straight-ahead driving of the vehicle. If the driver is applying a counter-steering torque to the example steering wheel 105 is excess of a threshold minimum steering torque during straight-ahead driving, the PDC 148 gradually phases in a compensating torque to reduce, if not eliminate, a continued need for the driver input torque $T_{DRIVER}$ to maintain the straight-ahead direction. To illustrate, following application of a driver input torque $T_{DRIVER}$ of X Newton-meters (N-m) (where X is any number) for a predetermined period of time, the PDC 148 phases in a compensating torque to reach a steady-state compensating torque of X N-m. Thus, the PDC 148 advantageously relieves a driver of a need to maintain a torque input to maintain a straight-ahead heading on a road cross slope (road camber) and/or under substantially steady-state lateral vehicle loadings (e.g., crosswinds, etc.).

Although the PDC 148 is described in the context of receiving driver input torque from the driver torque sensor 115, the PDC 148, in other examples, measures a steady-state steering wheel angle offset applied by the driver via a steering angle sensor and determines a compensating torque corresponding to the steering wheel angle offset.

As with the PAS 140, the PDC 148 outputs a compensating torque responsive to a continued, substantially steady-state driver input torque $T_{DRIVER}$, to an example steering controller 145, which may modify the compensating torque (e.g., via a limiter, etc.) prior to outputting a control signal to an example motor controller 146, which controls an output of an example motor 147 to the example gearbox 120 and the example steering pinion 125 and to thereby control a movement of the example steering rack 130 and a movement of example wheels 135 to effect steering movement.

In some examples, an example road camber compensator 150 uses data from one or more example imagers 155 to determine a road camber ahead of the vehicle. In some examples, an example imager 155 includes a forward-facing imaging device to image a road in front of the vehicle as the vehicle moves along the road 205. The example imager 155 borne by the vehicle may include, for example, an image sensor, a computer vision system, a digital camera, a video camera, a laser scanner, a light detection and ranging (LiDAR) sensor, a charge-coupled device (CCD) or a complementary metal-oxide-semiconductor (CMOS) device. In one example, the example imager 155 is the ON semiconductor AR0132AT, providing a resolution of about 1.2 MP with a combined field of view (FoV) of about 52×39 degrees. In some examples, the example imager 155 provides a resolution needed of about 1.0 MP with a minimum FoV of about 45 degrees. In other examples, the example imager 155 includes an ultrasonic range finder. For instance, an example imager 155 includes a narrowly-directed ultrasonic range finder disposed forwardly of, and centered about, each wheel 135 (e.g., in the front of the vehicle, such as the fascia, etc.) to obtain road height data in front of each wheel.

In some examples, an example road camber compensator 150 uses data from one or more vehicle sensors 160. The example vehicle sensors 160 may include, for example, inertial sensors (e.g., an inertial measurement unit (IMU) including one or more accelerometers to measure vehicle specific forces such as rotations and/or accelerations, etc.), electronic control unit (ECU) sensors, electronic engine control (EEC) sensors, wheel speed sensors, suspension height sensors, steering wheel angle sensors, brake pressure sensors and/or wheel pressure sensors. For instance, one or more vehicle suspension height sensor(s) and/or one or more vehicle pitch sensor(s) are used by the example road camber compensator 150 to determine a longitudinal acceleration and a weight transfer of the vehicle. The longitudinal acceleration and weight transfer of the vehicle are then used in a vehicle dynamics model by the example road camber compensator 150 to estimate a vertical force from the longitudinal acceleration and the weight transfer. The example road camber compensator 150 uses this vertical force to determine a compensating torque corresponding thereto. In some examples, an example road camber compensator 150 uses data from one or more example imagers 155 and from one or more vehicle sensors 160.

Unlike the feedback-based PDC 148, the example road camber compensator 150 is a feed-forward system that anticipates expected compensating torques and outputs such compensating torques to the example steering controller 145 to assist the driver in adapting to transient changes in road camber. The example steering controller 145 may modify the compensating torque (e.g., via a limiter, etc.) prior to outputting a control signal to the example motor controller 146. The example road camber compensator 150 determines the compensating torques to apply in view of data stored in example memory 164 (example vehicle data 165), example memory 166 (example wheel trajectory data 167) and example memory 168 (example road height data 169), as shown in FIG. 1. For example, the example road camber compensator 150 relates the example wheel trajectory data 167 to the example road height data 169 and, in view of the example vehicle data 165, determines a compensating torque to apply to the example steering rack 130 at a particular time in the future (e.g., in 10 milliseconds (ms), 20 ms, 30 ms, 40 ms, . . . 1 second, 2 seconds, 3 seconds, 4 seconds, 5 seconds, etc.) to assist the driver in adapting to impending changes in road camber. For instance, the example imager 155 road height data 169 indicates a change in road camber 30 feet ahead of the vehicle and the road camber compensator 150 phases in, via example motor controller 146, a compensating torque reflecting a difference between the current road camber and the road camber at the position in front of the vehicle when the vehicle traverses that position on the road.

Figure 2A:
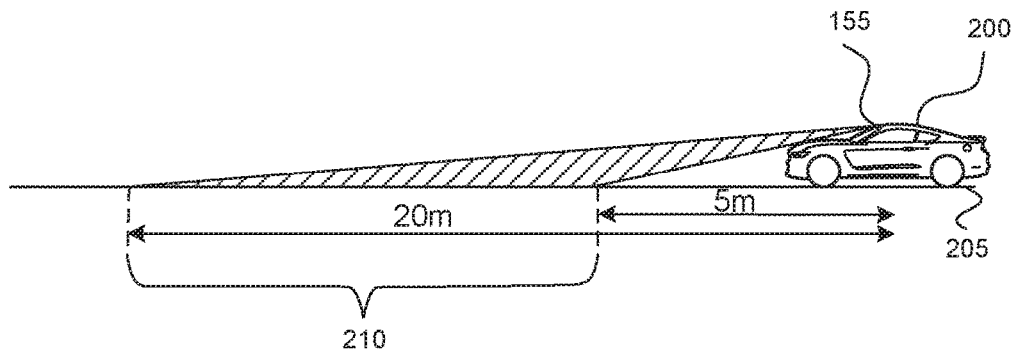
FIGS. 2A-2B depict an example implementation of an example road camber compensator in accordance with the teachings of this disclosure.
Figure 2B:
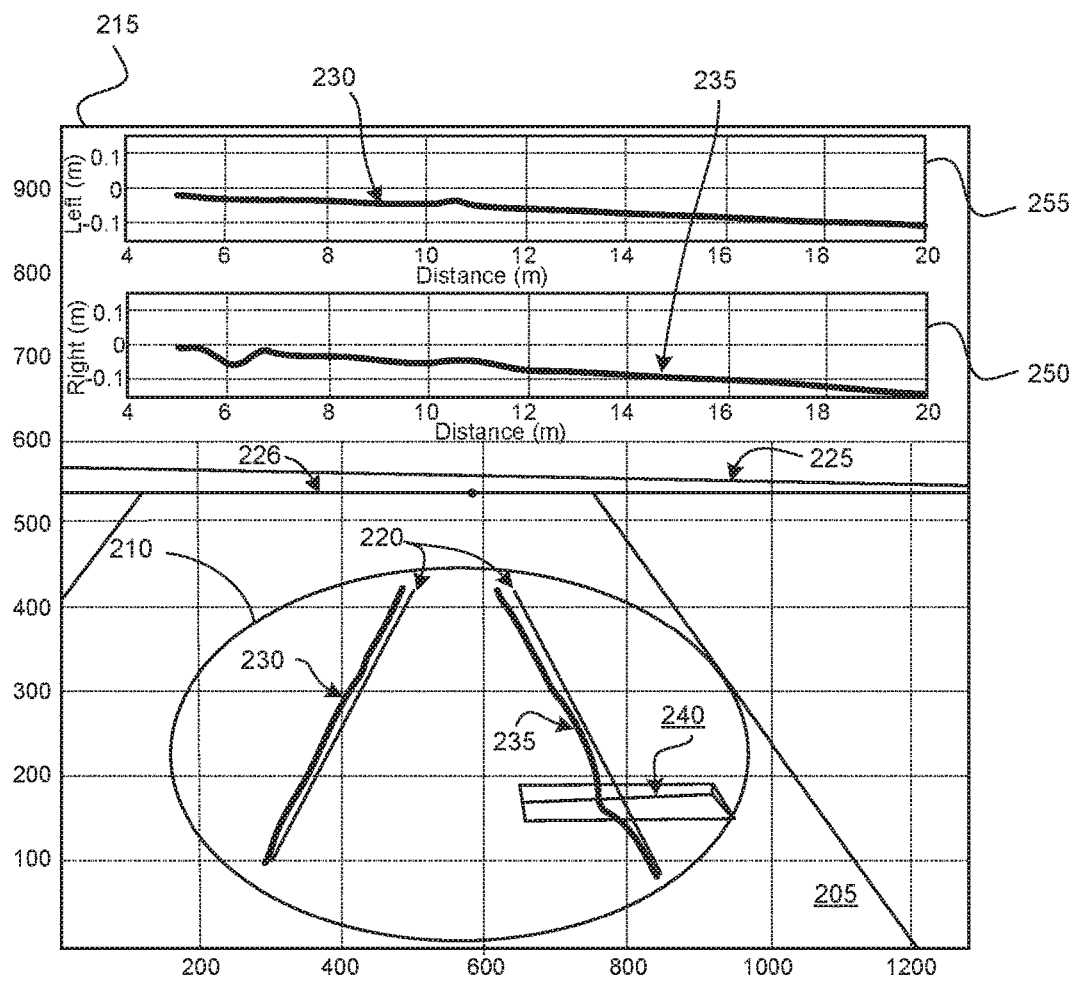

FIGS. 2A-2B depict an example implementation of a road camber compensator 150 in accordance with the teachings of this disclosure. An example vehicle 200 traveling along a road 205 uses the example imager 155 to image a portion of the road 205 in front of the vehicle 200. In the example shown in FIG. 2A, the example imager 155 is to image a road position 210 between a position five meters in front of the vehicle 200 to a position twenty meters in front of the vehicle 200. In some examples, the example imager 155 images a plurality of points in the portion of the road position 210 in front of the vehicle, which may include a plurality of points in a direction of movement of the vehicle and/or a plurality of points in a direction transverse to the direction of movement of the vehicle. In some examples, the example imager 155 images one hundred or more (e.g., 150, 200, 250, etc.) points on the road position 210 in front of the vehicle 200 along a direction of movement of the vehicle.

For a particular vehicle, such as example vehicle 200, the example imager 155 is initialized to the vehicle to establish an appropriate reference frame (e.g., a three dimensional Cartesian coordinate system or spherical coordinate system with the center of the example imager 155 being disposed at the origin (0, 0, 0) of the coordinate system, etc.). Using this coordinate system, a spatial orientation of the vehicle within the coordinate system is established. For instance, vehicle design data is used to determine a lateral distance from the origin to a left wheel centerline and to a right wheel centerline to permit determination of a wheel trajectory for the left wheel and the right wheel. As another example, vehicle design data and/or example imager 155 measurement data is used to establish a height of the origin relative to a surface of the road 205. From the established origin, the example imager 155 is able to determine a location of any selected point in the road position 210 in front of the vehicle 200 and, correspondingly, a height of such selected point.

FIG. 2B shows an example image 215 from the example imager 155 of FIG. 2A facing forward to a road position 210 in front of the vehicle 200. In this example image 215, example parallel lines 220 represent a straight-ahead direction of the vehicle (e.g., a steering angle of 0° or normal to the steering rack 130). Example line 225 represents a true horizon (i.e., a horizontal plane). Example line 226 represents a tangent to the road surface at a distant point (e.g., at the horizon). In the example of FIG. 2B, the location of the line 226 (tangent to road) below the line 225 (horizon) indicates the road 205 is on a slight downslope relative to the line 225 along a direction of travel of the vehicle 200. The relatively larger differential between the line 226 and the line 225 on the left side of the road 205 indicates the road 205 has a road camber or cross slope expressed downwardly and toward the left.

An example first wheel trajectory 230 for the vehicle 200 left front wheel and an example second wheel trajectory 235 for the vehicle 200 right front wheel are shown in FIG. 2B. These lines correspond to a trajectory along a centerline of each of the left front wheel and the right front wheel. In the example shown, the example first wheel trajectory 230 and the example second wheel trajectory 235 dynamically reflect changes in steering wheel angle. The example first wheel trajectory 230 and the example second wheel trajectory 235 indicate that the left wheel and the right wheel are turned slightly to the left of the direction of movement represented by lines 220.

The example first wheel trajectory 230 and the example second wheel trajectory 235 each show height data for the road, along the respective wheel trajectories, between a first position about 5 meters in front of the vehicle 200 and a second position about 10 meters in front of the vehicle 200. In this road position 210 in front of the vehicle 200, the example imager 155 takes about 200 measurements of road height along the example first wheel trajectory 230 and the example second wheel trajectory 235 (e.g., a measurement of height each 0.025 meters along a direction of travel). This number of measurement points is merely an example and a lesser number of measurements, even a small number of measurements (e.g., 2, 3, 4, 5, etc.), could be used to establish a wheel trajectory, albeit to a coarser degree of refinement. A number of measurement points larger than that provided in the example (e.g., more than 200 measurements) could also be taken by the example imager 155. The measurements for a height of the road 205 or derivatives thereof (e.g., road camber) in front of the vehicle 200 are maintained in example memory 168 as road height data 169 for each measurement position.

In some examples, rather than determining a single trajectory for each of the first wheel trajectory 230 and the second wheel trajectory 235 (e.g., a single trajectory along a centerline of each wheel), a plurality of trajectories (e.g., 2 trajectories, 3 trajectories, etc.) are determined for each wheel. For instance, the example first wheel trajectory 230 may itself include a plurality of first wheel trajectories such as a centerline trajectory (i.e., a trajectory of a centerline of the wheel) and one or more offset trajectories that are offset from the centerline trajectory by one or more predetermined distances.

To illustrate one example, the example first wheel trajectory 230 includes a centerline trajectory and a first offset trajectory set apart from, and substantially parallel to, the centerline trajectory in a first direction (e.g., to a left of the centerline trajectory) or a second direction (e.g., to a right of the centerline trajectory) by a first distance (e.g., 1 cm, 2 cm, 3 cm, etc.) and the second wheel trajectory 235 includes a centerline trajectory and a first offset trajectory set apart from the centerline trajectory in the first direction or the second direction by a first distance (e.g., 1 cm, 2 cm, 3 cm, etc.). To illustrate another example, the example first wheel trajectory 230 includes a centerline trajectory, a first offset trajectory set apart from the centerline trajectory to one side of the centerline trajectory by the first distance and a second offset trajectory set apart from the centerline trajectory to the other side of the centerline trajectory by the second distance. Likewise, in this example, the example second wheel trajectory 235 includes a centerline trajectory, a first offset trajectory set apart from the centerline trajectory to one side of the centerline trajectory by the first distance and a second offset trajectory set apart from the centerline trajectory to the other side of the centerline trajectory by the second distance.

In some examples, the first offset trajectory and the second offset trajectory are spaced apart in the same direction from the centerline trajectory of the respective first wheel trajectory 230 or second wheel trajectory 235 (i.e., on the same side relative to the centerline trajectory). In some examples, the example imager 155 takes measurements of a height of the surface of the road 205 in a road position 210 in front of the vehicle for the centerline trajectory, the first offset trajectory, and the second offset trajectory (e.g., a measurement of height each 0.025 meters along a direction of travel) for the example first wheel trajectory 230 and/or the example second wheel trajectory 235.

The measurement of the wheel trajectories relative to the direction of movement of the vehicle, as indicated by the parallel lines 220, facilitates determination of a road camber for each of the front wheels of the vehicle 200 at the road position 210 in front of the vehicle 200. Information on the road camber, or changes in the road camber, that the vehicle 200 will encounter facilitates a feed forward control system to permit the example steering compensator 102 to determine and/or implement adjustments to steering (e.g., via the example motor controller 146, the example motor 147, the example gearbox 120, the example steering pinion 125, the example steering rack 130 and the example wheels 135) in advance of reaching the road position 210 in front of the vehicle 200 or upon reaching such road position 210 (i.e., the vehicle 200 is traversing, or traveling over, the road position 210).

FIG. 2B illustrates a depression 240 (e.g., a pothole, etc.) in the road position 210 starting at a distance of about 5.5 meters in front of the vehicle and ending at a distance of about 6.5 meters in front of the vehicle. The example imager 155 height measurements are shown in a right wheel plot 250 and a left wheel plot 255 of FIG. 2B. The decrease in the height of the surface of the road 205 in the depression 240, and corresponding localized change in road camber, is reflected in the right wheel plot 250, which indicates a depression height of about 0.05 meters (5 centimeters). As noted above, the location of the line 226 (tangent to road) below the line 225 (horizon) indicates the road 205 is on a slight downslope relative to the line 225 along a direction of travel of the vehicle 200. This is likewise reflected in the right wheel plot 250 and the left wheel plot 255, which show that the height of the road 205, relative to the vehicle, is decreasing with increasing distance (e.g., a difference of about −0.14 meters for the right wheel plot 250 and a difference of about between about −0.10 meters for the left wheel plot 255) 5-20 meters in front of the vehicle (e.g., the field of view of the road position 210 imaged by the example imager 155).

Figure 3:
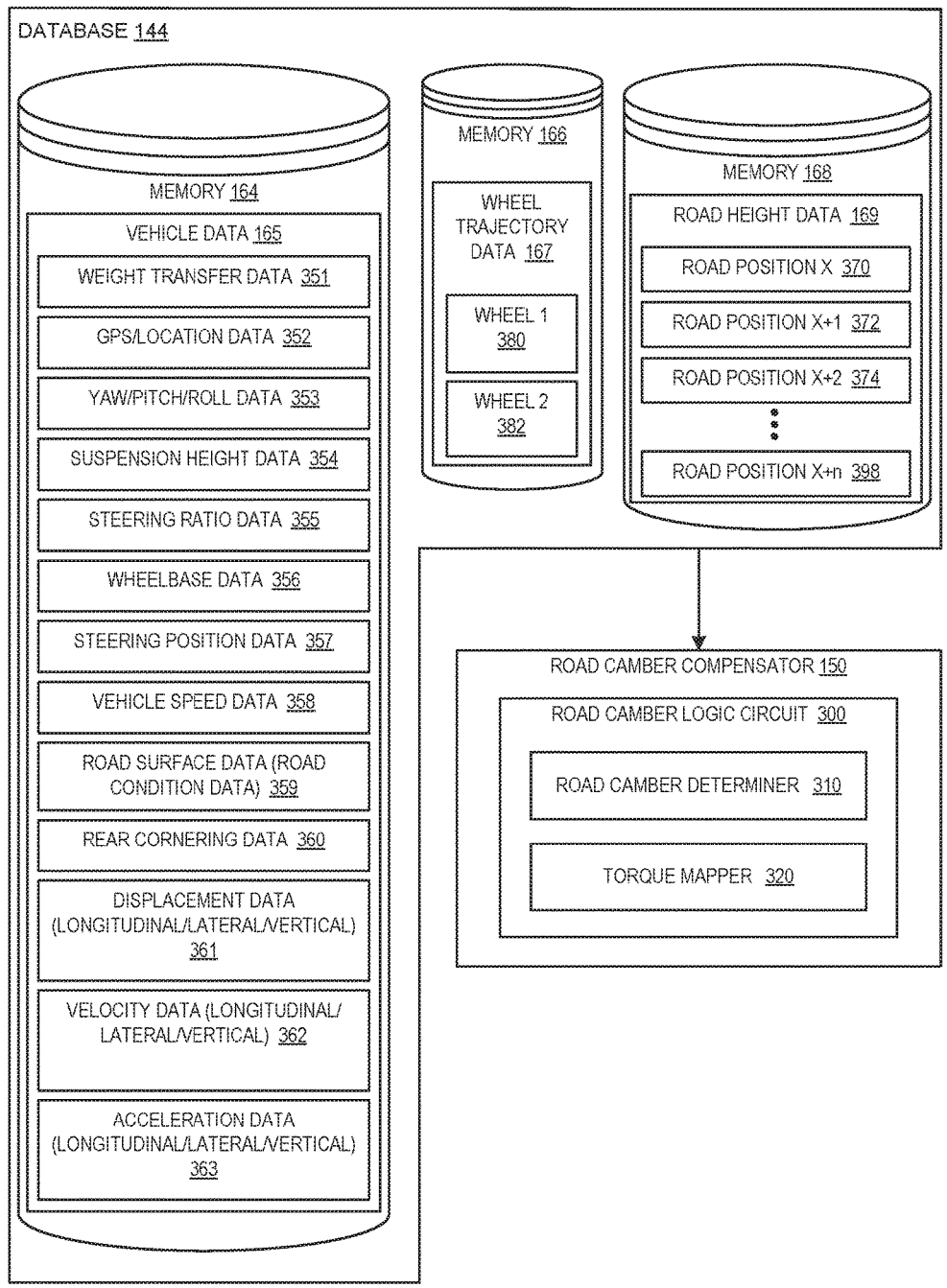
FIG. 3 is a block diagram of an example road camber compensator of an example steering compensator in accordance with the teachings of this disclosure.

FIG. 3 is a block diagram of an example road camber compensator 150 of an example steering compensator 102. As shown in FIG. 1, the example road camber compensator 150 receives example road height data 169 from example memory 168, example wheel trajectory data 167 from example memory 166 and/or example vehicle data 165 from example memory 164 and determines a compensating torque to apply to the example steering rack 130 to assist a rapid adaptation of the driver to transient changes in road camber.

FIG. 3 depicts a block diagram of an example logic circuit used to implement the example road camber compensator 150 of FIG. 1. In the illustrated example of FIG. 3, the example road camber compensator 150 includes an example road camber logic circuit 300, an example road camber determiner 310 and an example torque mapper 320. However, other example implementations of the example road camber compensator 150 may include fewer or additional structures.

The example road camber logic circuit 300 uses the example road camber determiner 310 to analyze the example vehicle data 165, the example wheel trajectory data 167 and/or the example road height data 169 to determine a road camber at position of the road 205 in front of the vehicle and/or under the vehicle, as applicable. In some examples, the example road camber determiner 310 determines one or more trajectories per wheel, using the wheel trajectory data 167 and the example road height data 169. In some examples, the example road camber determiner 310 combines a plurality of trajectories for a wheel (e.g., by averaging the trajectories, by taking a weighted average of the trajectories, etc.). In some examples, the example road camber determiner 310 combines trajectories for a plurality of wheels (e.g., by averaging the trajectories of a left wheel and a right wheel, by taking a weighted average of the trajectories of the left wheel and the right wheel, etc.).

The example road camber determiner 310 provides the determined road camber to the example torque mapper 320, which includes one or more look-up tables to permit a determination of a compensating torque to be applied to the example steering rack 130 at a specific time (e.g., a time at which the vehicle will traverse a point along the road 205 represented by the example wheel trajectory data 167 and/or the example road height data 169, etc.). For instance, the example torque mapper 320 may include a 1D map mapping an angle of road camber to a corresponding column torque to be applied to the example steering rack 130 as a feed-forward compensation. In another example, the example torque mapper 320 may include a mapping of an estimated angle of road camber to an output, such as the rack force for each wheel, that can then be used by the example steering controller 145 or the example steering compensator 102 to obtain a steering pinion 125 torque (e.g., summing the rack force for each wheel and multiplying the result by a conversion factor to obtain pinion torque, etc.). Thus, in some examples, the example torque mapper 320 determines the compensating torque that corresponds to the road camber and outputs the result to the example steering controller 145 and, in other examples, determines a force or other output that may be correlated to a compensating torque by the example steering controller 145 and/or the example steering compensator 102.

The vehicle data 165 may include, for example, weight transfer data 351, GPS data or location data 352, yaw/pitch/roll data 353, suspension height data 354, steering ratio data 355, wheelbase data 356, steering position data 357, vehicle speed data 358, road surface data (road condition data) 359 (e.g., local coefficient of friction, µ, for each wheel, etc.), rear cornering data 360, displacement data (longitudinal/lateral/vertical) 361, velocity data (longitudinal/lateral/vertical) 362 and/or acceleration data (longitudinal/lateral/vertical) 363.

The wheel trajectory data 167 may include, for example, wheel trajectory data for wheel 1 380 (e.g., left front wheel) and wheel trajectory data for wheel 2 382 (e.g., right front wheel).

The road height data 169 may include, for example, road height data 169 for a first road position 370 (e.g., road position X), a second road position 372 (e.g., road position X+1), a third road position 374 (e.g., road position X+2), etc. to an $n^{th}$ road position 398 (e.g., road position n, where n is any integer). For instance, using the example of FIG. 2B, where measurements of wheel trajectory were taken at increments of about 0.025 meters along a direction of travel, starting at a distance of 5 meters in front of the vehicle, road position 370 corresponds to a road position of 5.0 meters, road position 372 corresponds to a road position of 5.025 meters and road position 374 corresponds to a road position of 5.050 meters. Road position 398 corresponds to a distal extent of the road position 210.

The example road camber compensator 150 of FIG. 3 may be implemented by a semiconductor device such as a processor, microprocessor, controller or microcontroller. The example road camber compensator 150 manages and/or controls the operation of the example road camber logic circuit 300, an example road camber determiner 310 and an example torque mapper 320 of FIG. 3.

The example torque mapper 320 of FIG. 3 may include, or may be implemented by, any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in operative association with the example torque mapper 320 may be stored in any file and/or data structure format, organization scheme, and/or arrangement. In some examples, the information stored in operative association with the example torque mapper 320 is accessible to a vehicle control module and/or vehicle communication device.

While an example manner of implementing the example road camber compensator 150 is illustrated in FIG. 3, one or more of the elements, processes and/or devices illustrated in FIG. 3 may be combined, divided, re-arranged, omitted, eliminated and/or implemented in any other way. Further, the example road camber compensator 150, the example road camber logic circuit 300, the example road camber determiner 310 and the example torque mapper 320 of FIG. 3 may be implemented by a semiconductor device such as a processor. The example road camber compensator 150, the example road camber logic circuit 300, the example road camber determiner 310 and the example torque mapper 320 of FIG. 3 may also be implemented by hardware, software, firmware and/or any combination of hardware, software and/or firmware. Thus, for example, any of the example road camber compensator 150, the example road camber logic circuit 300, the example road camber determiner 310 and the example torque mapper 320 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example road camber compensator 150, the example road camber logic circuit 300, the example road camber determiner 310 and the example torque mapper 320 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example road camber compensator 150 of FIG. 3 may include one or more elements, processes and/or devices in addition to, or instead of, those illustrated in FIG. 3, and/or may include more than one of any or all of the illustrated elements, processes and devices.

FIGS. 4A-4B are block diagrams of a first example steering compensator 400 and a second example steering compensator 410 in accordance with the teachings of this disclosure.

FIG. 4A shows a torque from the driver of the vehicle ($T_{DRIVER}$) being applied to an example first operator 412 and to the example PAS 140. In some examples, the example first operator 412 is to perform addition or subtraction on inputs, adding or subtracting scalar, vector, or matrix inputs, and outputs the result. In the illustrated example, the example first operator 412 is to add a first input, $T_{DRIVER}$ and a second input $T_{MOTOR}$, described below, to yield $T_{RACK}$, a torque applied to the example steering rack 130 of FIG. 1. As described in relation to FIG. 1, the PAS 140 uses the driver input torque $T_{DRIVER}$ applied to the steering wheel 105 to look up an assistive torque, using vehicle-specific boost curves 142 stored in the example memory 143, to amplify the driver input torque $T_{DRIVER}$. This assistive torque, denoted as $T_{ASSIST}$ in FIG. 4A, is applied as an input to an example second operator 414. As also described in relation to FIG. 1, and as shown in FIG. 4A, the driver input torque $T_{DRIVER}$ is applied to the example PDC 148. In some examples, rather than applying the driver input torque $T_{DRIVER}$ to the PDC 148, the assistive torque, the $T_{ASSIST}$ of FIG. 4A is applied to the PDC 148, as both $T_{DRIVER}$ and $T_{ASSIST}$ are related to the driver input torque. The PDC 148 determines an output torque, $T_{PDC}$, to apply to the example steering rack 130 based on the driver input torque and a corresponding look-up table, cache, queue or the like.

FIG. 4A shows that the PDC 148 output torque, $T_{PDC}$, is applied to the example steering controller 145, which includes an example torque determiner 420 and an example limiter 430 and, more particularly, to the example torque determiner 420. The road camber compensator 150 output torque, $T_{ESTIMATE}$, is also applied to the example torque determiner 420. Example of the road camber compensator 150 are described below in relation to FIGS. 5-8.

The example torque determiner 420 determines, as between the $T_{PDC}$ and $T_{ESTIMATE}$ inputs, a total torque $T_{TOTAL}$. In some examples, the example torque determiner 420 sums $T_{PDC}$ and $T_{ESTIMATE}$. In some examples, the example torque determiner 420 weights one of, of both of, $T_{PDC}$ and $T_{ESTIMATE}$ prior to combination (e.g., summation). In some examples, the example torque determiner 420 selects a higher one of $T_{PDC}$ and $T_{ESTIMATE}$. In some examples, the example torque determiner 420 selects a lower one of $T_{PDC}$ and $T_{ESTIMATE}$. In some examples, the torque determiner 420 uses $T_{ESTIMATE}$ as $T_{TOTAL}$ if the determined change in road camber is above a predetermined threshold and uses $T_{PDC}$ as $T_{TOTAL}$ if the determined change in road camber is below the predetermined threshold since the road camber compensator 150 is more adept at handling larger transients. The output of the example torque determiner 420 may then itself be limited by the example limiter 430. For example, if the example torque determiner 420 sums $T_{PDC}$ and $T_{ESTIMATE}$ and the output total torque $T_{TOTAL}$ is above a fixed or variable threshold value, the output total torque $T_{TOTAL}$ may be reduced. The example steering controller 145 outputs a torque to be applied, $T_{APPLIED}$, to the example second operator 414.

In some examples, the example torque determiner 420 updates the PDC 148 with the output total torque $T_{TOTAL}$. In some examples, the example torque determiner 420 updates the PDC 148 with the road camber compensator 150 output torque, $T_{ESTIMATE}$. This feedback from the example torque determiner 420 enables the adaptability of PDC 148, as otherwise the only input to the PDC 148 is driver torque.

The example second operator 414, in the example depicted, sums the $T_{APPLIED}$ from the example steering controller 145 and the $T_{ASSIST}$ from the example PAS 140 and outputs the sum, $T_{MOTOR}$, to the example first operator 412. The total torque applied to the steering rack 130 is thus the combination of the torque input by the driver $T_{DRIVER}$, boosted by PAS 140, and the torque, $T_{APPLIED}$, from the example steering controller 145.

The block diagram of FIG. 4B is similar to the block diagram of FIG. 4A, but the second example steering compensator 410 omits the PDC 148 of FIG. 4A.

FIG. 4B shows a torque from the driver of the vehicle ($T_{DRIVER}$) being applied to an example third operator 440 and to the example PAS 140, which is similar to the first operator 412 and second operator 414 of FIG. 4A. In the illustrated example, the example third operator 440 is to add a first input, $T_{DRIVER}$ and a second input $T_{MOTOR}$ to yield $T_{RACK}$, a torque applied to the example steering rack 130 of FIG. 1.

FIG. 4B shows that the PAS 140 output torque, $T_{ASSIST}$, is applied to the example steering controller 145, which includes an example torque determiner 420 and an example limiter 430 and, more particularly, to the example torque determiner 420. The road camber compensator 150 output torque, $T_{ESTIMATE}$, is also applied to the example torque determiner 420. Example of the road camber compensator 150 are described below in relation to FIGS. 5-8.

The example torque determiner 420 determines, as between the $T_{ASSIST}$ and $T_{ESTIMATE}$ inputs, a total torque $T_{TOTAL}$. In some examples, the example torque determiner 420 sums $T_{ASSIST}$ and $T_{ESTIMATE}$. In some examples, the example torque determiner 420 weights one of, of both of, $T_{ASSIST}$ and $T_{ESTIMATE}$ prior to combination (e.g., summation). In some examples, the example torque determiner 420 selects a higher one of $T_{ASSIST}$ and $T_{ESTIMATE}$. In some examples, the example torque determiner 420 selects a lower one of $T_{ASSIST}$ and $T_{ESTIMATE}$. The output of the example torque determiner 420 may then itself be limited by the example limiter 430. For example, if the example torque determiner 420 sums $T_{ASSIST}$ and $T_{ESTIMATE}$ and the output total torque $T_{TOTAL}$ is above a fixed or variable threshold value, the output total torque $T_{TOTAL}$ may be reduced. The example steering controller 145 outputs a torque to be applied, $T_{MOTOR}$, to the example third operator 440. The total torque applied to the steering rack 130 is thus the torque input by the driver $T_{DRIVER}$, as modified by the torque input, $T_{MOTOR}$, from the example steering controller 145.

Figure 5:
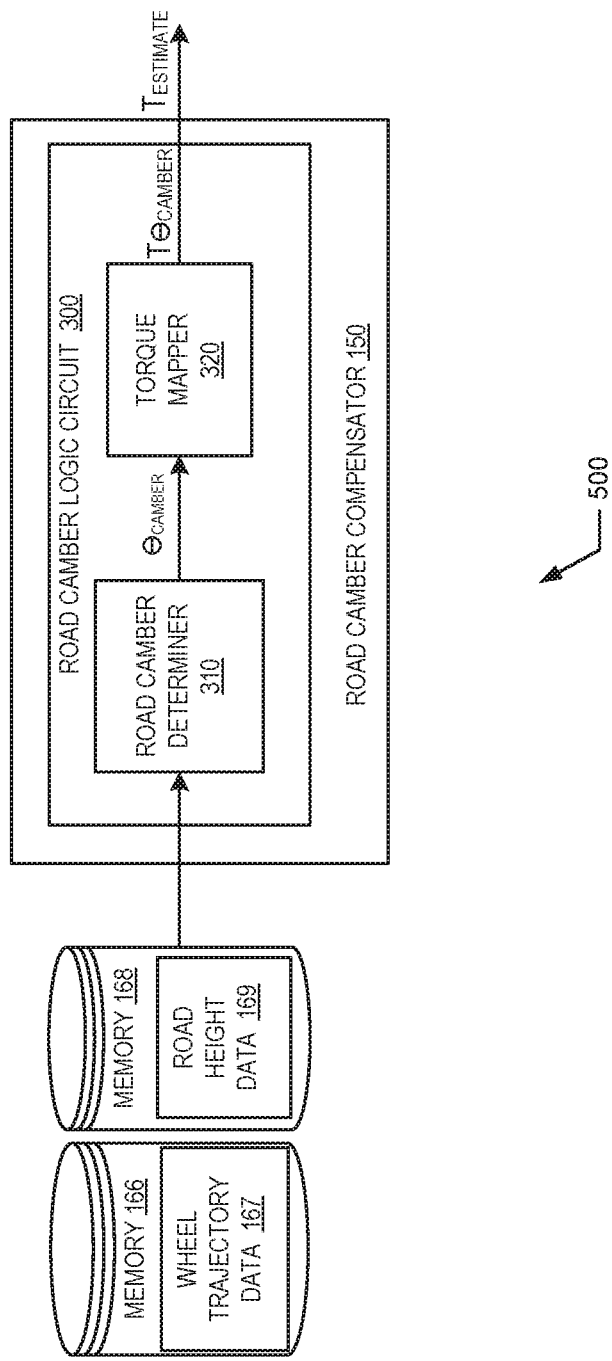
FIG. 5 is a block diagram of a first example road camber compensator in accordance with the teachings of this disclosure.

FIG. 5 shows a first example 500 of an example road camber compensator 150 implementable in combination with the structures of FIG. 1 and FIGS. 4A-4B. The example road camber compensator 150 of FIG. 5 includes an example road camber logic circuit 300 having an example road camber determiner 310 and an example torque mapper 320. The example road camber compensator 150, and more particularly the road camber determiner 310 of the road camber logic circuit 300, receives, as inputs, example wheel trajectory data 167 from example memory 166 and example road height data 169 from example memory 168 (see, e.g., FIGS. 2A-2B, 3). The road camber determiner 310 uses the example wheel trajectory data 167 and the example road height data 169 to determine the road camber, $\Theta_{CAMBER}$, such as described in relation to FIG. 2B. For example, for a position of the road 205 in front of the vehicle, one or more trajectories are determined for each wheel and a plurality of points along each trajectory are used to determine relative height differences between a height of one or more points at a specified distance in front of the vehicle (e.g., a distance X, where X is any number) along one or more left wheel trajectories and a height of one or more points at a specified distance in front of the vehicle (e.g., the distance X) along one or more right wheel trajectories. The height differential data of the points along the wheel trajectories permits determination of the road transverse height difference and road camber, $\Theta_{CAMBER}$. The example torque mapper 320 outputs the determined torque based on road camber estimate T$\ominus_{CAMBER}$ to the torque determiner 420 as the determined torque estimate T$_{ESTIMATE}$, as shown in FIGS. 4A-4B.

The road camber $\ominus_{CAMBER}$ is output to the example torque mapper 320, which uses one or more look-up tables, which may include weighting factors, to select a compensating torque to apply to the example steering rack 130 at a specific time (e.g., when the vehicle is at position X in the example above). In some examples, the example torque mapper 320 uses the road camber $\ominus_{CAMBER}$ for a specific point of the road in front of the vehicle (e.g., position X) to determine a column torque to be applied at that point when the vehicle traverses that point. In some examples, the example torque mapper 320 uses the road camber $\ominus_{CAMBER}$ for a plurality of distances of the road in front of the vehicle (e.g., positions X−3, X−2, X−1, X, X+1, X+2, X+3) to determine a column torque to be applied at a specific point (e.g., position X) when the vehicle traverses that specific point. Stated differently, in some examples, the example torque mapper 320 averages road heights or gradients along a direction of travel of the vehicle to moderate noise in applied column torque to be applied at a specific point.

Figure 6A:
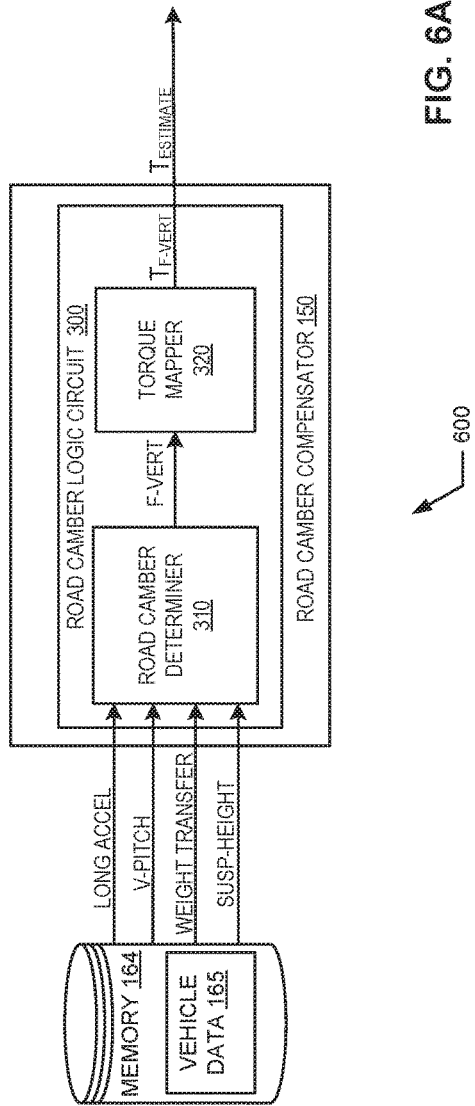
FIG. 6A is a block diagram of a second example road camber compensator in accordance with the teachings of this disclosure.

FIG. 6A shows a second example 600 of an example road camber compensator 150 implementable in combination with the structures of FIG. 1 and FIGS. 4A-4B. The example road camber compensator 150 of FIG. 6A includes an example road camber logic circuit 300 having an example road camber determiner 310 and an example torque mapper 320. The example road camber compensator 150, and more particularly the road camber determiner 310 of the road camber logic circuit 300, receives example vehicle data 165 from example memory 164 (see, e.g., FIG. 3) as inputs. The example road camber determiner 310 uses the example vehicle data 165 to determine a state of the vehicle, or a change in a state of the vehicle. In the example of FIG. 6A, vehicle pitch data 353, V-PITCH, and vehicle suspension height data 354, SUSP-HEIGHT, is input to the example road camber determiner 310. The example road camber determiner 310 applies a vehicle dynamics model to determine, from the example V-PITCH and the example SUSP-HEIGHT, a state of the vehicle at a given position on a road, such as a longitudinal acceleration of the vehicle (LONG ACCEL) and/or a weight transfer (WEIGHT TRANSFER) of the vehicle. The example torque mapper 320 outputs the determined torque based on vertical force estimate T$_{F-VERT}$ to the torque determiner 420 as the determined torque estimate T$_{ESTIMATE}$, as shown in FIG. 6A.

Figure 6B:
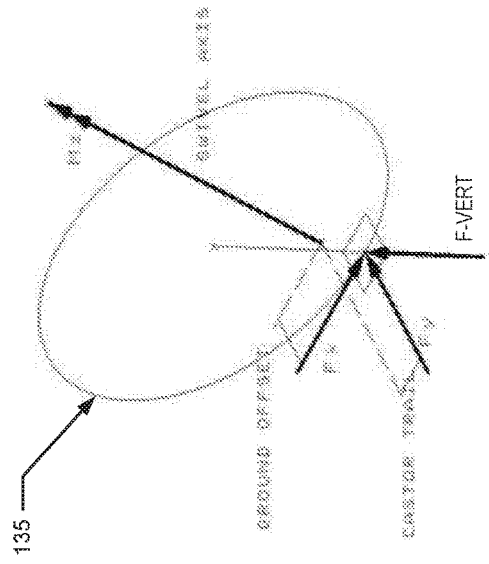
FIG. 6B is an example determination of a vehicle vertical force for implementation by the second example road camber compensator of FIG. 6A.

In FIG. 6A, the example road camber determiner 310 uses a vehicle dynamics model to estimate vehicle vertical forces from the longitudinal acceleration of the vehicle (LONG ACCEL) and the weight transfer (WEIGHT TRANSFER) of the vehicle. For example, when the vehicle traversing the road 205 experiences a change from a left camber to a right camber the suspension height information can be used by the road camber determiner 310 to predict the change and to quickly adjust the torque output to the steering rack 130. To illustrate, FIG. 6B shows an example where the road camber determiner 310 uses the height information to calculate the forces in the suspension spring that would be transferred to the vertical force (F-VERT) on the wheel 135. The vertical force (F-VERT) can be used by the torque mapper 320, or alternatively the road camber determiner 310, to determine a moment around the kingpin (M$_Z$) from the ground offset and castor trail, shown in FIG. 6B. This moment M$_Z$ can be converted by the torque mapper 320 into the steering rack 130 force through the steering arm and then into the corresponding pinion torque to apply (T$_{ESTIMATE}$) through the vehicle pinion/rack ratio from the steering ratio data 355 of the vehicle data 165. In another example, the suspension height data, SUSP-HEIGHT, for a left wheel 135 and a right wheel 135 are used to determine a height difference between the left and right wheels 135 for a portion of the road 205 over which the vehicle is traversing. The difference in height is used by the torque mapper 320, or alternatively the road camber determiner 310, to determine an inclination angle and to convert the inclination angle to an estimated camber angle by application of a suitable gain. The torque mapper 320 uses a look up table (e.g., lateral force vs. camber angle, normal force vs. camber angle, etc.) to convert the camber angle to a steering rack 130 force through the steering arm and then into the corresponding pinion torque to apply (T$_{ESTIMATE}$) through the vehicle pinion/rack ratio from the steering ratio data 355 of the vehicle data 165.

Figure 7:
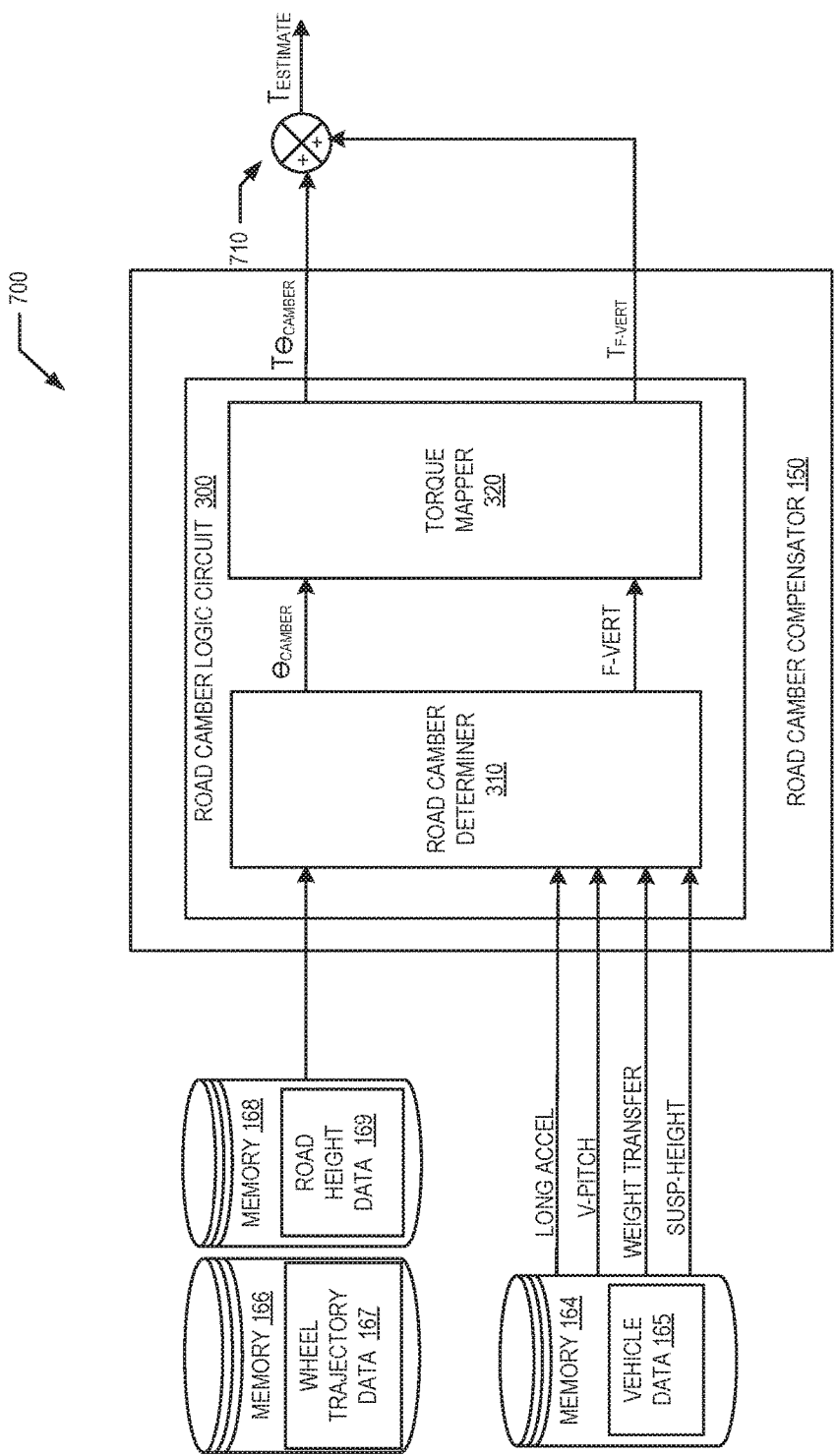
FIG. 7 is a block diagram of a third example road camber compensator in accordance with the teachings of this disclosure.

FIG. 7 shows a third example 700 of an example road camber compensator 150 implementable in combination with the structures of FIG. 1 and FIGS. 4A-4B. The example road camber compensator 150 of FIG. 7 includes an example road camber logic circuit 300 having an example road camber determiner 310 and an example torque mapper 320. The example road camber compensator 150, and more particularly the road camber determiner 310 of the road camber logic circuit 300, receives example vehicle data 165, example wheel trajectory data 167 and example road height data 169 (see, e.g., FIGS. 2A-2B, 3) as inputs. In this third example 700, the road camber determiner 310 determines both T$\ominus_{CAMBER}$ and T$_{F-VERT}$, discussed above in relation to FIG. 5 and FIG. 6A, and outputs both T$\ominus_{CAMBER}$ and T$_{F-VERT}$ to the example fourth operator 710, which outputs T$_{ESTIMATE}$ to the torque determiner 420 of the steering controller 145. In some examples, each of the T$\ominus_{CAMBER}$ and T$_{F-VERT}$ may be used as a check on, or a limit on, the other one of T$\ominus_{CAMBER}$ and T$_{F-VERT}$. In some examples, the torque determiner 420 may favor T$_{F-VERT}$ in certain conditions (e.g., snow, lighting, fog, heavy rain, etc.) and favor T$\ominus_{CAMBER}$ in certain other conditions (e.g., dry roads, excellent visibility, etc.). In other examples, weighing factors could be applied to each of T$\ominus_{CAMBER}$ and T$_{F-VERT}$ based on confidence of the output and the modified values of T$\ominus_{CAMBER}$ and T$_{F-VERT}$ summed. In still other examples, one of the T$\ominus_{CAMBER}$ or T$_{F-VERT}$ is used as feedback as to the accuracy of the other one of T$\ominus_{CAMBER}$ or T$_{F-VERT}$.

Figure 8:
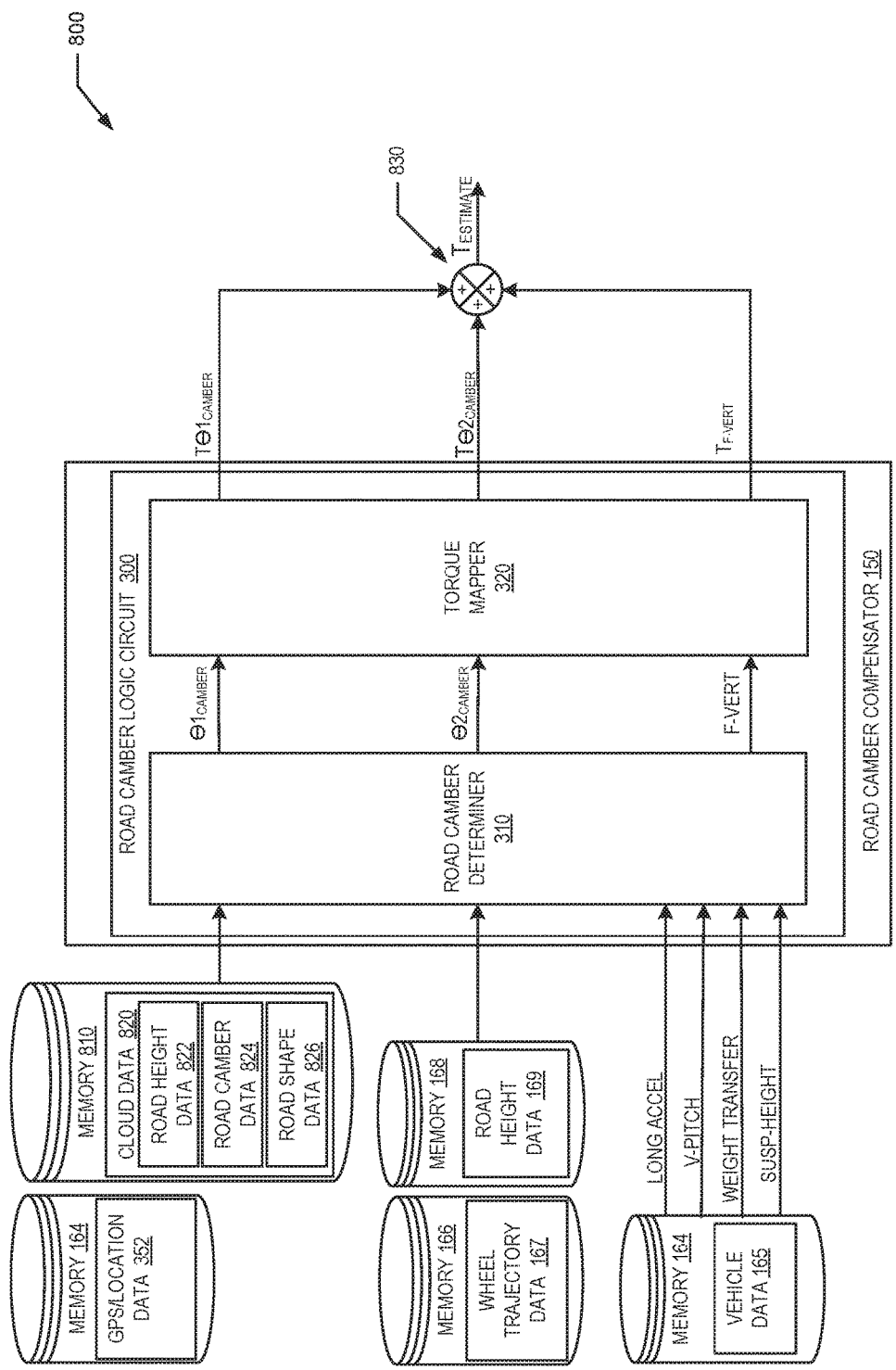
FIG. 8 is a block diagram of a fourth example road camber compensator in accordance with the teachings of this disclosure.

FIG. 8 shows a fourth example 800 of an example road camber compensator 150 implementable in combination with the structures of FIG. 1 and FIGS. 4A-4B. In most respects, the fourth example 800 of the road camber compensator 150 is similar to the third example 700 of the road camber compensator 150. The example road camber compensator 150 of FIG. 8 includes an example road camber logic circuit 300 having an example road camber determiner 310 and an example torque mapper 320. The example road camber compensator 150, and more particularly the road camber determiner 310 of the road camber logic circuit 300, receives example vehicle data 165, example wheel trajectory data 167, and example road height data 169.

However, the example road camber determiner 310 of FIG. 8 also receives, as an input, example cloud data 820 from example memory 810 and example location data (e.g., GPS data) 352 from memory 164. The example cloud data 820 may include, for example, road camber data corresponding to a location of the vehicle indicated by the example location data 352. For instance, an example survey vehicle scans a road shape to monitor a condition of the road. The road surface data (e.g., road height data 822, road camber data 824, road shape data 826, etc.) obtained from the survey data is maintained in a publicly-accessible database available to the example road camber determiner 310 to supplement, modify and/or supplant determinations of road camber obtained from the wheel trajectory data 167, road height data 169 and/or vehicle data 165. Additionally or alternatively, the cloud data 820 may include road height data 822 and/or road camber data 824 and/or road shape data 826, in association with location data, obtained from road camber compensators of other vehicles on the road in front of the vehicle 200 or from vehicles that recently traversed the road 205 (e.g., vehicle-to-vehicle (V2V) communication, etc.)). In some examples, the cloud data 820 represents road height data 822 and/or road camber data 824 and/or road shape data 826, in association with location data, from road-based transponders (e.g., vehicle-to-infrastructure (V2I) communication, etc.)).

The road camber compensator 150 of FIG. 8 the example road camber determiner 310 uses the example cloud data 820 to determine a first road camber ($\Theta_{CAMBER}$). The example torque mapper 320 uses the first road camber to determine a corresponding torque ($T\Theta1_{CAMBER}$), which is output to the example fifth operator 830. The example road camber determiner 310 uses the wheel trajectory data 167 and road height data 169 to determine a second road camber ($T\Theta2_{CAMBER}$) and uses vehicle data 165 to determine $T_{F\text{-}VERT}$, similar to FIG. 7. $T\Theta2_{CAMBER}$ and $T_{F\text{-}VERT}$ are output to the example fifth operator 830.

In some examples, the example fifth operator 830 uses any of $T\Theta1_{CAMBER}$, $T\Theta2_{CAMBER}$ and $T_{F\text{-}VERT}$ as a check on, or a limit on, another one or more of $T\Theta1_{CAMBER}$, $T\Theta2_{CAMBER}$ and $T_{F\text{-}VERT}$. In some examples, the torque determiner 420 may favor $T_{F\text{-}VERT}$ or $T\Theta1_{CAMBER}$ in certain conditions (e.g., snow, lighting, fog, heavy rain, etc.) and favor $T\Theta2_{CAMBER}$ in certain other conditions (e.g., dry roads, excellent visibility, etc.). In other examples, weighing factors could be applied to each of $T\Theta1_{CAMBER}$, $T\Theta2_{CAMBER}$ and $T_{F\text{-}VERT}$ based on confidence in the data and the modified values of $T\Theta1_{CAMBER}$, $T\Theta2_{CAMBER}$ and $T_{F\text{-}VERT}$ summed. In still other examples, one of the $T\Theta1_{CAMBER}$, $T\Theta2_{CAMBER}$ and $T_{F\text{-}VERT}$ is used as feedback as to the accuracy of the other one or more of $T\Theta1_{CAMBER}$, $T\Theta2_{CAMBER}$ and $T_{F\text{-}VERT}$. The example fifth operator 830 outputs $T_{ESTIMATE}$ to the torque determiner 420 of the steering controller 145.

Figure 9:
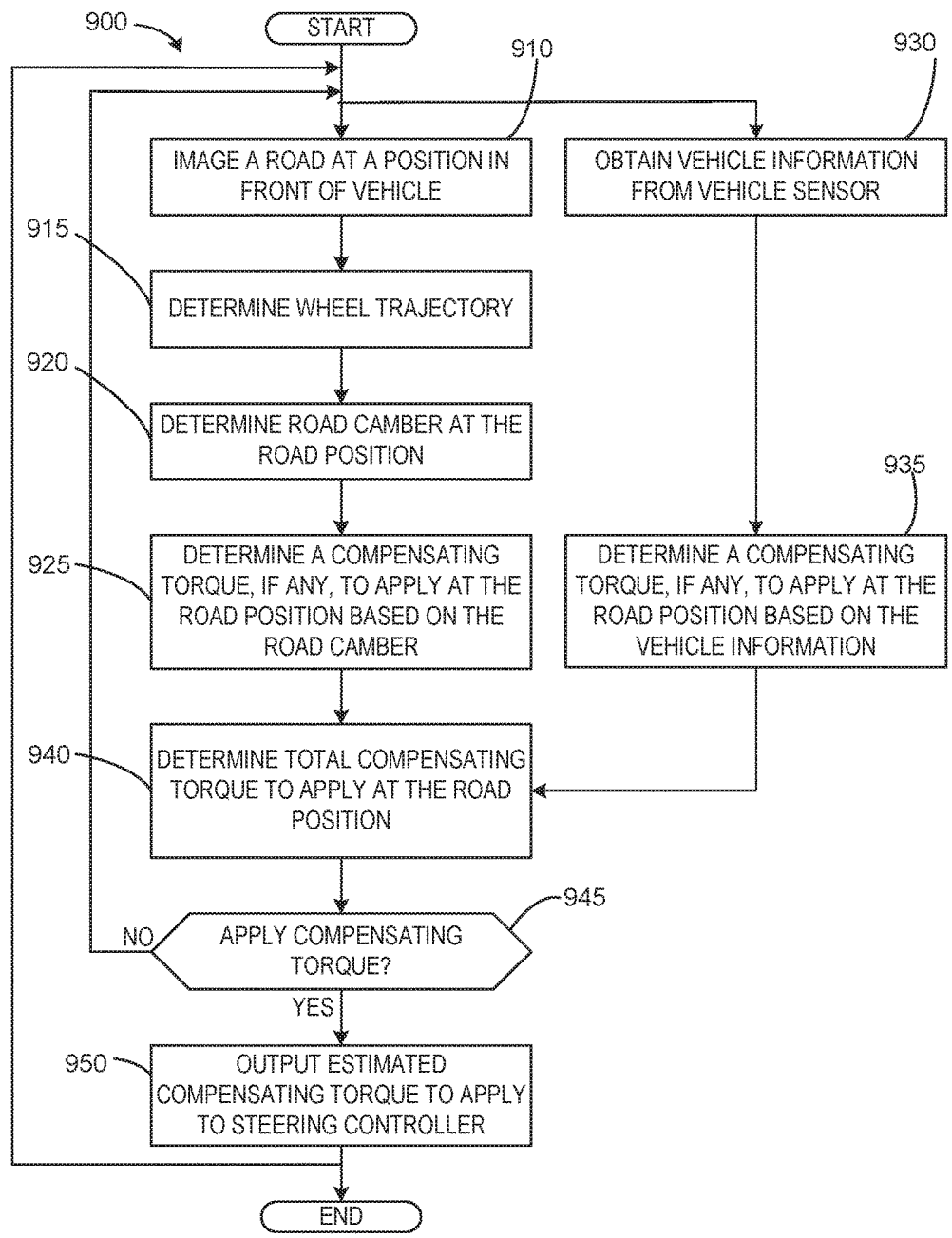
FIG. 9 is a flowchart representative of machine readable instructions which may be executed to implement the road camber compensator of FIGS. 1-8.

A flowchart representative of an example routine 900 for implementing the example road camber compensator 150 of FIG. 3 to dynamically assist vehicle steering is shown in FIG. 9. In the example of FIG. 9, the routine 900 may be implemented using machine-readable instructions that comprise one or more program(s) for execution by a processor such as the example processor 1012 of the example processor platform 1000 discussed below in connection with FIG. 10. The one or more program(s) may be embodied in software stored on a tangible computer readable storage medium such as a CD-ROM, a floppy disk, a hard drive, a digital versatile disk (DVD), a Blu-ray disk, or a memory associated with the processor 1012, but the enwheel program(s) and/or parts thereof could alternatively be executed by a device other than the processor 1012 and/or embodied in firmware or dedicated hardware. Further, although the example program(s) is/are described with reference to the flowchart illustrated in FIG. 9, many other methods for implementing the example road camber compensator 150 of FIG. 3 may alternatively be used. For example, the order of execution of the blocks may be changed, and/or some of the blocks described may be changed, eliminated, or combined.

As mentioned above, the example routine 900 of FIG. 9 to dynamically assist vehicle steering may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example routine 900 of FIG. 9 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example routine 900 begins at block 910 when the example road camber compensator 150 uses the example imager 155 to image a road position 210 in front of the vehicle 200, such as shown in FIGS. 2A-2B. Control then passes to block 915.

At block 915, the example road camber compensator 150 determines a wheel trajectory relative to the image of the road at the position in front of the vehicle obtained at block 910, such as is described in relation to FIG. 2B. Control then passes to block 920.

At block 920, the example road camber compensator 150 determines a road camber at the road position in front of the vehicle using the image of the road at a position in front of the vehicle obtained at block 915 and the wheel trajectory determined at block 915, such as is described in relation to FIG. 2B. Control then passes to block 925.

At block 925, the example road camber compensator 150 determines a compensating torque, if any, to apply at the road position when the vehicle traverses the road position based on the road camber determined at block 920, such as is described in relation to FIG. 5 or FIGS. 7-8. Control then passes to block 930.

At block 930, the example road camber compensator 150 obtains vehicle information from one or more vehicle sensors, such as is described in relation to FIGS. 6A-8. Control then passes to block 935.

At block 935, the example road camber compensator 150 determines a compensating torque, if any, to apply at the road position 210, when the vehicle traverses or travels over the road position 210, based on the vehicle information obtained at block 930 from the one or more vehicle sensors (see, e.g., FIG. 6A). Control then passes to block 940.

At block 940, the example road camber compensator 150 determines a total compensating torque ($T_{ESTIMATE}$) to apply at the road position 210, responsive to the wheel trajectory data 167 and road height data 169 and/or the vehicle data 165 when the vehicle traverses or travels over the road position 210. For instance, with reference to FIG. 7, the example fourth operator 710 determines $T_{ESTIMATE}$ from $T\Theta_{CAMBER}$ and $T_{F-VERT}$ and passes $T_{ESTIMATE}$ to the torque determiner 420 of the steering controller 145. Control then passes to block 945.

At block 945, the routine 900 determines whether a compensating torque is to be applied from the example road camber compensator 150 to the example steering controller 145. If the total compensating torque ($T_{ESTIMATE}$) is non-zero, the result is "YES" and the value of the total compensating torque is passed to the example steering controller 145. If the result at block 945 is "NO" control returns to blocks 910, 930.

At block 950, the total compensating torque ($T_{ESTIMATE}$) determine at block 940 is output to the example steering controller 145, where it is combined with (e.g., added, subtracted, etc.), modifies, or is modified by the PDC 148 output torque, $T_{PDC}$. Control then returns to blocks 910, 930.

As noted above, FIG. 10 is a block diagram of an example processor platform 1000 capable of executing the example instructions of FIG. 9 to implement the example road camber compensator 150 of FIG. 1 and FIGS. 3-8. The processor platform 1000 may be implemented by a server, a desktop computer, a laptop computer, a terminal, a dedicated device, a control module, a microcomputer or any other type of computing device.

Figure 10:
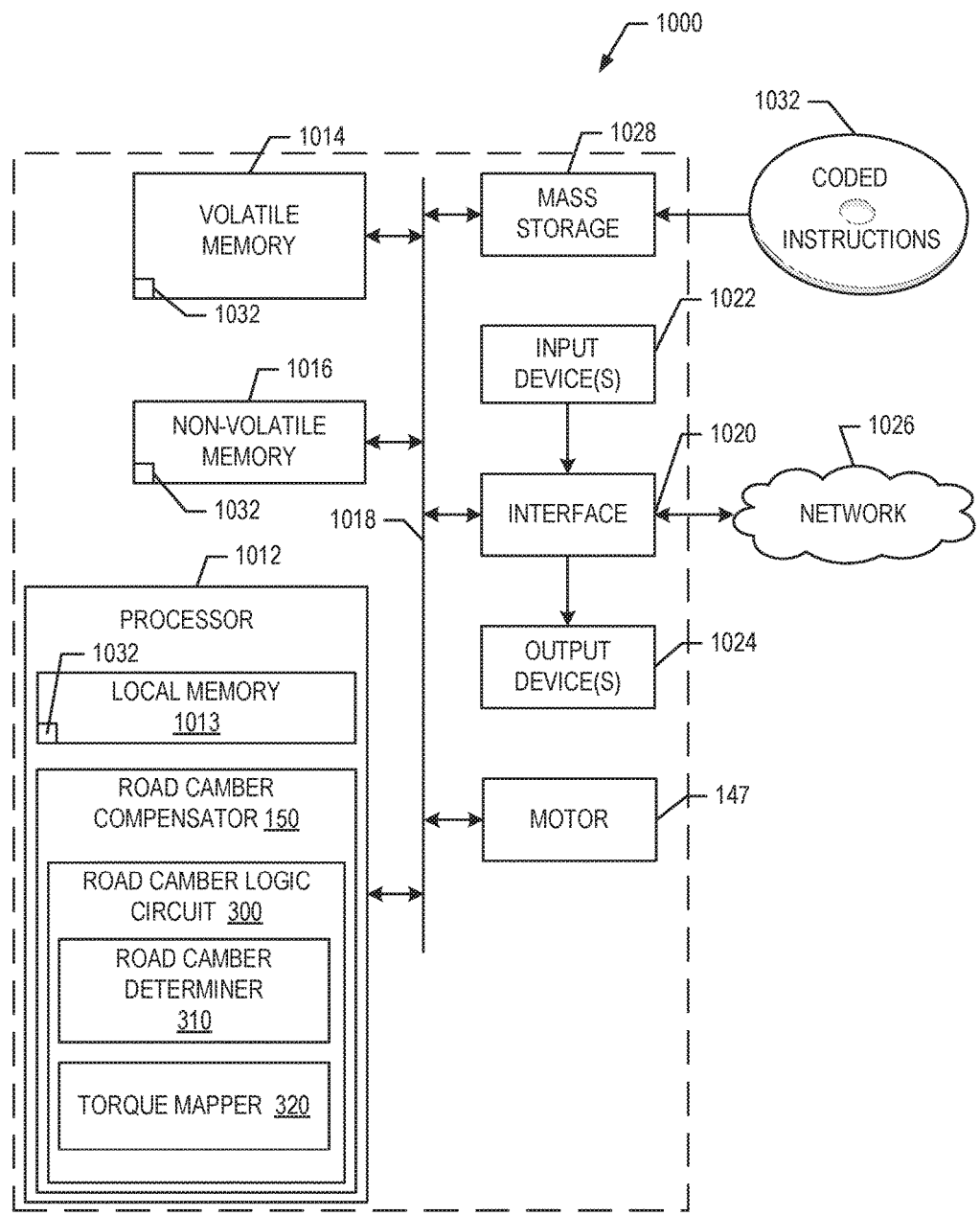
FIG. 10 is a block diagram of an example processor platform which may execute the example instructions of FIG. 9 to implement the road camber compensator of FIGS. 1-8.

The processor platform 1000 of the illustrated example includes a processor 1012. The processor 1012 of the illustrated example is hardware. For example, the processor 1012 can be implemented by integrated circuits, logic circuits, microprocessors or controllers from any desired family or manufacturer. In the example of FIG. 10, the processor 1012 implements the example road camber compensator 150. As such, it implements the road camber logic circuit 300, the road camber determiner 310 and the torque mapper 320.

The processor 1012 of the illustrated example includes a local memory 1013 (e.g., a cache). The processor 1012 of the illustrated example is in communication with a main memory including a volatile memory 1014 and a non-volatile memory 1016 via a bus 1018 (e.g., a Controller Area Network (CAN)). The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory (e.g., 1014, 1016) is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, input device(s) 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer, speakers, etc.). In some examples, the interface circuit 1020 includes a graphics driver card, a graphics driver chip or a graphics driver processor.

In some examples, the example road camber compensator 150 of the illustrated examples is operatively associated with a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIG. 10, represented generally in FIG. 9, may be stored in the mass storage device 1028, in the volatile memory 1014, in the non-volatile memory 1016, and/or on a removable tangible computer readable storage medium such as a CD, DVD or solid-state memory device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. For instance, while a single imager 155 is described in relation to the example of FIGS. 2A-2B, a plurality of imagers 155 can be used, such as a first imager 155 for a first wheel and a second imager for a second wheel.

What is claimed is:

1. A steering compensation apparatus, comprising:
a road camber determiner to determine a first road camber at a first road position associated with a current position of front wheels of a vehicle and a second road camber at a second road position in front of the vehicle using wheel trajectory data and height data of the second road position;
a road camber logic circuit to select, via a torque mapper mapping a plurality of road cambers to a plurality of first compensating torques, a first compensating torque corresponding to a difference between the first road camber and the second road camber; and
a steering controller to drive a motor to deliver the selected first compensating torque to a steering rack at the second road position responsive to the difference between the first road camber and the second road camber.

2. The apparatus of claim 1, wherein the road camber determiner is to determine the first road camber from vehicle data obtained via a vehicle sensor at the first road position.

3. The apparatus of claim 2,
wherein the vehicle data includes suspension height data from a vehicle suspension height sensor,
wherein the road camber determiner is to determine first vehicle vertical forces corresponding to the suspension height data, wherein the torque mapper maps a plurality of first vehicle vertical forces corresponding to the suspension height data to a corresponding plurality of second compensating torques, wherein the road camber logic circuit is to select, via the torque mapper, a second compensating torque corresponding to the first vehicle vertical forces; and wherein the steering controller is to drive the motor to deliver to the steering rack at the second road position a total compensating torque corresponding to a combination of the selected first compensating torque and the selected second compensating torque.

4. The apparatus of claim 2, wherein the vehicle data includes vehicle pitch data from a vehicle pitch sensor, wherein the road camber determiner is to determine second vehicle vertical forces corresponding to the vehicle pitch data, wherein the torque mapper maps a plurality of second vehicle vertical forces corresponding to the vehicle pitch data to a corresponding plurality of third compensating torques, wherein the road camber logic circuit is to select, via the torque mapper, a third compensating torque corresponding to the second vehicle vertical forces; and wherein the steering controller is to drive the motor to deliver to the steering rack at the second road position a total compensating torque corresponding to a combination of the selected first compensating torque and the selected third compensating torque.

5. The apparatus of claim 2, wherein the vehicle data includes suspension height data from a vehicle suspension height sensor and vehicle pitch data from a vehicle pitch sensor, wherein the road camber determiner is to determine first vehicle vertical forces corresponding to the suspension height data and second vehicle vertical forces corresponding to the vehicle pitch data, wherein the torque mapper maps a plurality of first vehicle vertical forces corresponding to the suspension height data to a corresponding plurality of second compensating torques and maps a plurality of second vehicle vertical forces corresponding to the vehicle pitch data to a corresponding plurality of third compensating torques, wherein the road camber logic circuit is to select, via the torque mapper, a second compensating torque corresponding to the first vehicle vertical forces and a third compensating torque corresponding to the second vehicle vertical forces; and wherein the steering controller is to drive the motor to deliver to the steering rack at the second road position a total compensating torque corresponding to a combination of the first compensating torque, the second compensating torque and the third compensating torque.

6. The apparatus of claim 1, further including a vehicle-borne laser scanner, an image sensor, a digital camera, a CCD, or a CMOS device to form the height data of the second road position.

7. The apparatus of claim 6, wherein the wheel trajectory data includes a first plurality of trajectories of a first wheel of the vehicle and a second plurality of trajectories of a second wheel of the vehicle.

8. The apparatus of claim 6, wherein the wheel trajectory data includes a first trajectory of a first wheel of the vehicle and a second trajectory of a second wheel of the vehicle.

9. The apparatus of claim 8, wherein the road camber compensator is to determine a first wheel camber for the first wheel at the second road position, to determine a second wheel camber for the second wheel at the second road position, and to determine the second road camber from the first wheel camber and the second wheel camber.

10. A steering compensation method, comprising:
determining, via a road camber compensator, a first road camber at a first road position associated with a current position of front wheels of a vehicle and a second road camber at a second road position in front of the vehicle using wheel trajectory data and height data of the second road position;

determining a first compensating torque based on a difference between the first road camber and the second road camber to apply to a steering rack; and applying the first compensating torque to the steering rack at the second road position.

11. The method of claim 10, further including the road position using a vehicle-borne laser scanner, image sensor, digital camera, CCD, or CMOS device to image the second road position to provide the height data.

12. The method of claim 11, further including using the road camber compensator to determine wheel trajectory data of a first wheel and to determine wheel trajectory data of a second wheel.

13. The method of claim 12, further including using the road camber compensator to determine a first wheel camber for the first wheel at the second road position and to determine a second wheel camber for the second wheel at the second road position.

14. The method of claim 13, further including using the road camber compensator to average the first wheel camber and the second wheel camber.

15. The method of claim 14, further including using the road camber compensator to determine a first plurality of trajectories of the first wheel of the vehicle at the second road position in front of the vehicle and to determine a second plurality of trajectories of the second wheel of the vehicle at the second road position.

16. The method of claim 14, further including:
determining, using the road camber compensator, a second compensating torque from vehicle data from at least one vehicle sensor;

combining, using the road camber compensator, the first compensating torque and the second compensating torque to determine an output torque; and applying the output torque to a steering controller to apply the output torque to the steering rack at the second road position.

17. The method of claim 16, wherein the vehicle data includes suspension height data from a vehicle suspension height sensor and vehicle pitch data from a vehicle pitch sensor, and wherein the road camber compensator determines a longitudinal acceleration from the suspension height data, a weight transfer from the vehicle pitch data, and vertical forces corresponding to the longitudinal acceleration and the weight transfer.

18. A tangible machine readable storage medium comprising instructions that, when executed, cause a processor to at least:
determine a first road camber at a first road position associated with a current position of front wheels of a vehicle and a second road camber at a second road position in front of the vehicle using wheel trajectory data and height data of the second road position;

determine a first compensating torque based on a difference between the first road camber and the second road camber to apply to a steering rack, via a vehicle power steering assist system; and apply the first compensating torque to the steering rack at the second road position.

19. The tangible machine readable storage medium of claim 18, further including instructions that, when executed, cause the processor to determine a second compensating torque from a driver input torque at the second road position as the vehicle traverses the second road position and to sum the first compensating torque and the second compensating torque to determine a total compensating torque.

20. The tangible machine readable storage medium of claim 18, further including instructions that, when executed, cause the processor to:

determine first vehicle vertical forces corresponding to vehicle suspension height data obtained by a vehicle suspension height sensor;

map a plurality of first vehicle vertical forces corresponding to the vehicle suspension height data to a corresponding plurality of second compensating torques;

select a second compensating torque corresponding to the first vehicle vertical forces; and deliver to the steering rack at the second road position a total compensating torque corresponding to a combination of the selected first compensating torque and the selected second compensating torque.

* * * * *